US012784727B2

(12) United States Patent
Russ et al.

(10) Patent No.: US 12,784,727 B2
(45) Date of Patent: *Nov. 3, 2026

(54) DYNAMIC CASINO-SPECIFIC PERSONALIZABLE SOUND ROUTING AND AUTOMATIC NOISE CANCELLATION

(71) Applicant: IGT, Las Vegas, NV (US)

(72) Inventors: Michael Russ, Graz (AT); Sven Aurich, Schwanberg (AT); Lukas Angermayer, Graz (AT); Michael Brunner, Graz (AT); Gerhard Pichler, Graz (AT); Julian Hofer, Pischelsdorf am Kulm (AT); Peter Fuerst, Oberpremstätten (AT); Romana Wagner, Leibnitz (AT)

(73) Assignee: IGT, Las Vegas, NV (US)

( * ) Notice: Subject to any disclaimer, the term of this patent is extended or adjusted under 35 U.S.C. 154(b) by 177 days.

This patent is subject to a terminal disclaimer.

(21) Appl. No.: 18/672,835

(22) Filed: May 23, 2024

(65) Prior Publication Data

US 2025/0363973 A1 Nov. 27, 2025

(51) Int. Cl.

| | |
|---|---|
| ***G10K 11/178*** | (2006.01) |
| ***G07F 17/32*** | (2006.01) |
| ***H04W 4/80*** | (2018.01) |

(52) U.S. Cl.

CPC .... *G10K 11/17823* (2018.01); *G07F 17/3223* (2013.01); *G07F 17/3237* (2013.01); *H04W 4/80* (2018.02)

(58) Field of Classification Search

None

See application file for complete search history.

(56) References Cited

U.S. PATENT DOCUMENTS

| | | | | |
|---|---|---|---|---|
| 8,005,473 | B2 * | 8/2011 | Zeinstra | H04M 1/6091 455/418 |
| 8,184,824 | B2 * | 5/2012 | Hettinger | H03G 3/344 463/20 |
| 11,234,073 | B1 * | 1/2022 | Xu | G10K 11/17857 |

(Continued)

FOREIGN PATENT DOCUMENTS

WO WO-2025231439 A1 * 11/2025 ........... H04R 1/1016

*Primary Examiner* — Qin Zhu

(74) *Attorney, Agent, or Firm* — Spencer Fane LLP; William M. Kelly

(57) ABSTRACT

Systems, methods and servers are provided. A system includes a wireless communication interface that is wirelessly coupled to multiple player audio devices in a casino. Provided is a processor circuit and a memory including machine-readable instructions that, when executed by the processor circuit, cause the processor circuit to perform a casino-specific sound routing operation using a casino-specific sound routing component that dynamically routes casino-specific sounds to adjust specific sound origins and perform an active noise cancellation (ANC) operation to receive player sound data to adjust specific sound origins. The received player sound data is used to personalize a casino-specific ANC profile, and to generate an ANC noise signal. The wireless communication interface is caused to send the casino-specific sound routing component and the ANC noise signal to ones of the player audio devices.

20 Claims, 12 Drawing Sheets

(56) References Cited

U.S. PATENT DOCUMENTS

| | | | | |
|---|---|---|---|---|
| 11,670,275 | B2 * | 6/2023 | Muggleton | A61F 11/145 381/56 |
| 2006/0014586 | A1 * | 1/2006 | Gatto | G07F 17/3216 463/46 |
| 2014/0302932 | A1 * | 10/2014 | Hilbert | G07F 17/3204 463/35 |
| 2015/0382106 | A1 * | 12/2015 | Kraft | H04W 4/021 381/119 |
| 2016/0329040 | A1 * | 11/2016 | Whinnery | G10K 11/17853 |
| 2020/0382859 | A1 * | 12/2020 | Woodruff | H03G 3/3005 |
| 2021/0006927 | A1 * | 1/2021 | Asada | G10L 15/22 |
| 2021/0248990 | A1 * | 8/2021 | Hamalainen | G10K 11/1783 |
| 2021/0281232 | A1 * | 9/2021 | Noertker | H04R 3/04 |
| 2021/0407490 | A1 * | 12/2021 | Cardoso | G10K 11/17823 |
| 2022/0189451 | A1 * | 6/2022 | Rui | G10K 11/1783 |
| 2022/0270583 | A1 * | 8/2022 | Fridman | G10K 11/1783 |
| 2023/0112073 | A1 * | 4/2023 | Yang | H04R 1/1016 381/71.6 |
| 2023/0329913 | A1 * | 10/2023 | Li | G10L 15/22 |

* cited by examiner

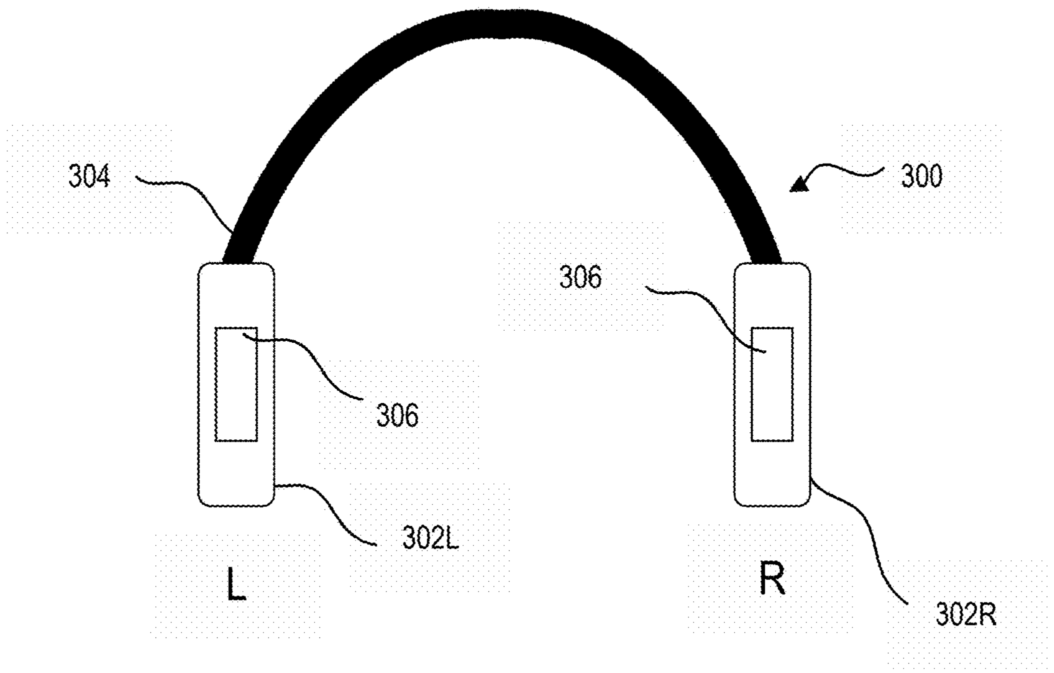
FIG. 3A
FIG. 3B
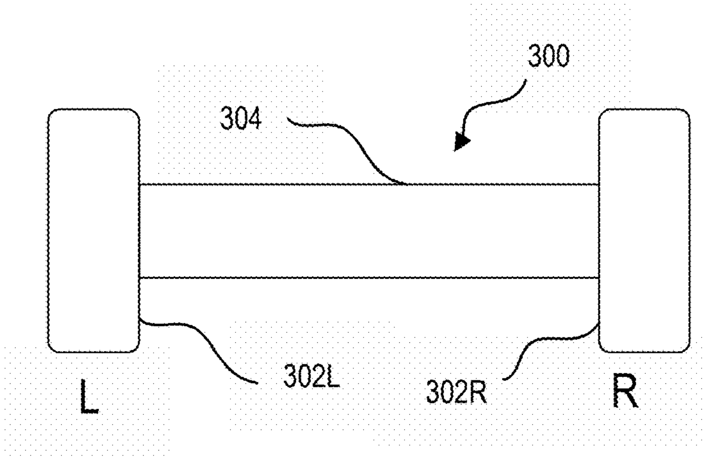
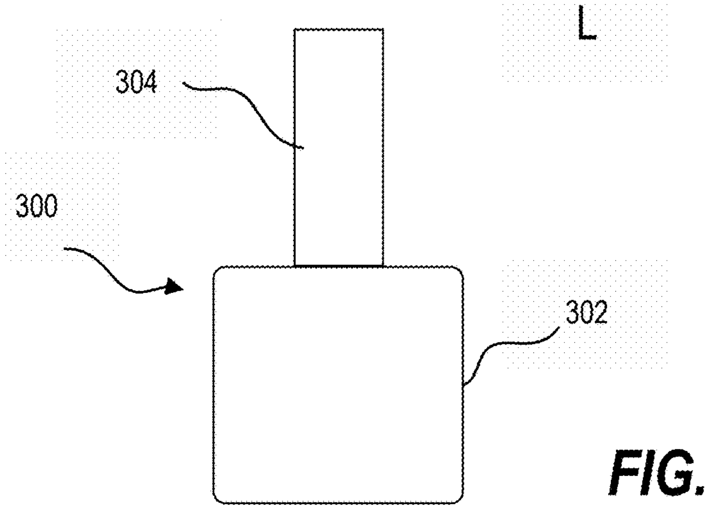
FIG. 3C

DYNAMIC CASINO-SPECIFIC PERSONALIZABLE SOUND ROUTING AND AUTOMATIC NOISE CANCELLATION

BACKGROUND

The field of disclosure herein is related to providing audio-based gaming experiences.

A casino environment is often noisy and noise-overwhelming as many gaming machine sounds, jackpot sounds, sounds of talking casino visitors, sounds of talking casino staff, casino-wide announcements, casino events/shows, and other sources often generate noise at the same time. Audio experiences in casino machines may be limited to regular stereo and/or surround speakers that may blast game audio substantially straight forward in front of the machine. Additional sensors, such as cameras and/or depth sensors, may be used to locate the position of a player in front of the machine, and use conventional directional sound technologies to try to provide more personal and targeted audio experiences. Additionally, these systems may also fail in providing personalized sound experiences as they may, to some extent, be hearable by other surrounding players. Accordingly, there is a need to provide a technical solution to the technical problem of improving audio-based gaming experience.

BRIEF SUMMARY

According to some embodiments, a system includes a wireless communication interface that is wirelessly coupled to multiple player audio devices in a casino, a processor circuit, and a memory including machine-readable instructions that, when executed by the processor circuit, cause the processor circuit to perform a casino-specific sound routing operation using a casino-specific sound routing component that dynamically routes casino-specific sounds to adjust specific sound origins. The processor circuit is further caused to perform an active noise cancellation (ANC) operation to receive player sound data to adjust specific sound origins. In some embodiments, the received player sound data may be used to personalize a casino-specific ANC profile, and to generate an ANC noise signal. In some embodiments, the wireless communication interface is caused to send the casino-specific sound routing component and the ANC noise signal to ones of the player audio devices.

According to some embodiments, operations for systems, methods, and devices for facilitating embodiments may be described herein. Operations corresponding to some methods may include connecting a casino wide Bluetooth based audio system with a plurality of wearable wireless audio devices, performing a casino-specific sound routing operation that adjusts casino audio channels and that routes casino-specific sounds based on a casino-specific sound routing operation, performing an active noise cancelling operation that comprises receiving player sound data, generating a noise cancelling signal, and sending the noise cancelling signal to a respective one of the wearable wireless audio devices. In some embodiments, operations include saving the casino specific sounds and the noise cancelling signal responsive to one of the wearable wireless audio devices disconnecting from the casino wide Bluetooth based audio system, and restoring the casino specific sounds and the noise cancelling signal responsive to the one of the wearable wireless audio devices reconnecting to the casino wide Bluetooth based audio system.

According to some embodiments, operations for systems, methods, servers, and devices for facilitating embodiments may be described herein. For example, embodiments may include a server that includes a wireless communication interface that is wirelessly coupled to a multiple player audio devices, a processor circuit, and a memory including machine-readable instructions that, when executed by the processor circuit, cause the processor circuit to operations. Operation according to some embodiments may include causing the processor circuit to perform a casino-specific sound routing operation using a casino-specific sound routing component that dynamically routes casino-specific sounds to adjust specific sound origins. In some embodiments, the casino-specific sounds include game sounds that are associated with games in a casino, casino environment sounds that are non-game sounds present in the casino, and casino announcement sounds that comprise communications that provide information corresponding to the casino. The processor circuit may be caused to perform an active noise cancellation (ANC) operation to receive player sound data, to adjust specific sound origins by letting a player personalize a casino-specific ANC profile, and to generate an ANC noise signal and to store user preference data corresponding to audio source specific user preferences. Some embodiments provide that user preference data is upgradable based on additional inputs received from the player. In some embodiments, the wireless communication interface is caused to send the casino-specific sound routing component and the ANC noise signal to ones of the player audio devices.

Embodiments disclosed herein may to provide the player with a dynamic, personalizable audio environment and audio experiences as they would desire to have in a casino environment. Provided are capabilities with Bluetooth connected head-worn audio devices such as headphones, ear pods, personal hearing aid devices or similar.

BRIEF DESCRIPTION OF SEVERAL VIEWS OF THE DRAWINGS

FIGS. 3A-3C are schematic block diagrams illustrating view of head worn audio devices having front, top and side views according to some embodiments.

DETAILED DESCRIPTION

Figure 1:
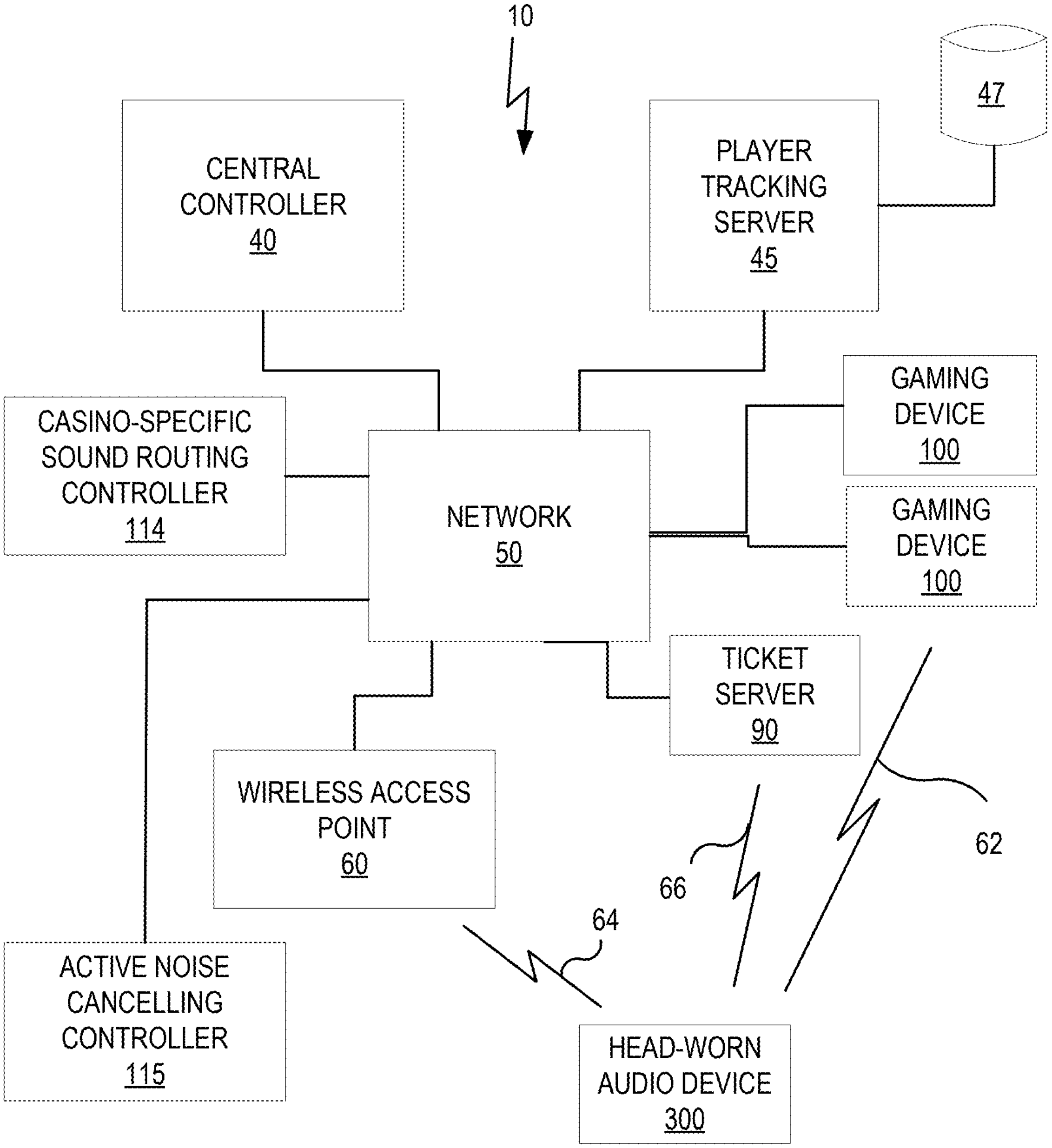
FIG. 1 is a schematic block diagram illustrating a network configuration for a plurality of gaming devices according to some embodiments.

As provided herein, a player may be provided with a dynamic, personalizable audio environment & audio experiences based on the desire of the player in a casino environment. Capabilities described herein may be provided based on capabilities of Bluetooth-connected head-worn audio devices such as headphones, ear pods, and/or personal hearing aid devices among others.

Some embodiments provide a Bluetooth-based casino audio system that is capable of centrally managing multiple Bluetooth-connected audio devices to provide dynamic, casino-specific sound routing and dynamic, casino-specific Active Noise Cancellation (ANC). According to embodiments herein, both the sound routing and the ANC may be used together to provide personalizable audio experiences. Such audio experiences may be provided based on underlying operator-provided master controls.

Embodiments herein include a casino-wide Bluetooth-based audio system that can connect with any Bluetooth-based audio device on the casino floor and may operate both a casino-specific sound routing component and a casino-specific ANC component. In some embodiments, the sound routing component allows the player to address and/or adjust multiple different sound origins and/or audio channels. For example, different sound origins may include game background music, jackpot jingle, and/or bingo-based casino announcements, among others, that are based on player preferences.

In some embodiments, the ANC component may allow the player to adjust several sound origins and/or audio channels respective to ANC by letting the player personalize their casino-specific ANC profile. A combination of both the sound routing component and the ANC component may provide the player with their desired audio environment and/or audio experiences for their casino visit.

According to some embodiments a casino system may connect multiple systems, devices and/or casino-specific components. In this manner, a casino system may provide an audio experience that is dynamic. The casino system may include and/or be connected to a casino-wide Bluetooth based audio system that may enable connection of all Bluetooth compatible audio devices on the casino floor. In some embodiments, a Bluetooth based audio system may limit the number of connected devices per access point. In such embodiments, tethering and/or multiple access point setups may be included. In some embodiments, each gaming device may provide such an access point.

In some embodiments, a casino-specific sound routing component may be connected to a casino-wide Bluetooth based audio system. The casino-specific sound routing component may provide support for sound type based sound routing. Some embodiments include a game's background music, a game's bonus music, a jackpot jingle, general casino announcements, and/or casino announcements, among others. For example, casino announcements may correspond to a bingo drawing, among others.

In some embodiments, a casino-specific sound routing component may provide audio channel based sound routing. For example, audio channel based sound routing may include a first EGM channel, a second EGM2 channel, a casino system announcement channel, and/or a jackpot controller channel, among others.

In some embodiments, a casino-specific ANC component may be connected to a casino-wide Bluetooth based audio system. Some embodiments include creating anti-noise signals to cancel unwanted noise out and/or to provide player with "clean" audio. The casino specific ANC component may be dynamic and thus may be responsive to conditions and/or activities in the casino. Some embodiments provide that the ANC component is provided in real time and/or may be area specific. In some embodiments, the ANC component may be casino specific and may automatically and selectively exclude people's voices. For example, the ANC component may only route through noises from other games on the floor so the user may not hear people, but may still hear other sounds contributed by other aspects of the full casino environment. In some embodiments, the ANC component may be trained using sound and/or voice recognition training to create a profile of known, repeated casino-specific sounds.

In some embodiments, reference microphones may be provided to enable ANC to monitor ambient sounds/noises. For example, a Bluetooth headphone integrated microphone and/or an EGM-integrated microphone may be connected to a mobile device's microphone.

In some embodiments, an audio personalization system that may be provided to the player may be used for both the sound routing component and the ANC component.

In some embodiments, a player may be provided with an option to select preferences from noise, wins, music, and/or announcements, among others. Some embodiments provide that an audio-toggle may be customizable for each source and/or type of noise. Some embodiments provide that player-specific preferences may be saved in a player account, a Blue tooth device, a mobile device and/or a hearing aid, among others. Some embodiments provide that some preferences may be executed automatically when connecting to game. For example, settings of a sound equalizer for previously played games may be automatically executed so the player may stay connected with the games they have played. Some embodiments provide that the player may keep hearing important audio throughout an entire casino visit.

In some embodiments, a volume and/or ANC intensity for each source may be selected separately. Some embodiments may include providing a master slider input for applying a similar level of adjustment for all channels.

In some embodiments, a Bluetooth head-worn audio device may include headphones, ear pods, and/or hearing aid devices, among others. Some embodiments may include Bluetooth capable gaming machines such as, for example, EGM's and/or electronic table games (EGTs), among others.

Some embodiments include a Bluetooth casino announcement system that provides information/messages to an entire casino and/or a portion thereof.

Some embodiments include a player's mobile device that may be connected to the Bluetooth head-worn audio device, the Bluetooth casino announcement system, and/or a gaming machine, among others.

Some embodiments provide that ANC logic may be integrated into a head-worn audio device.

Embodiments herein may include sounds that correspond to one or more game sounds, one or more casino environment sounds and/or one or more announcement sounds. Such game sounds may be generated by one or more games including a game that may be in attract mode, a game being played by a player and/or from a game being played by another player. Game sounds may include background music, symbol and/or animation sounds, bonus feature music win sounds, such as win jingles, jackpot win sounds, progressive sounds, signage sounds, and/or attract mode sounds, among others.

In some embodiments, game sounds may be split off into a separate audio channel to make processing easier. For example, a background music channel may be routed through EGM speakers while jackpot wins may be provided through a Bluetooth headphone. This may be implemented since it is known which sound is created by which game and/or game event.

Some embodiments provide that one or more casino environment sounds may include casino staff voice, other visitor voice, event/show performers voice, event/show sounds, electronic table game sounds, noise from other areas (e.g., restaurant sounds), voice of people approaching, animal sounds, and/or phone calls, sounds and voices, among others.

In some embodiments, casino environment sounds may provide that a repeated voice, such as staff voice/event performers' voice etc. may be differentiated based on voice recognition systems. Some embodiments include a self-training voice rec system that uses self-learning to identify voices that are recognized repeatedly (e.g., by hearing a casino staff member's voice repeatedly over X days might be interpreted by the system as casino staff). Some embodiments provide a manually trained system that is trained with voice sample data (such as Amazon's Alexa initial voice rec training process), where the system is fed with training data of each respective voice source. Some embodiments include a combination of the automatically trained and the manually trained systems in which the system may be initially trained with sample voice training data using manual voice recordings, and fine-tunes, self-optimizes, and/or improves itself over time.

Similar approaches may be used for repeated sounds, such as repeated game sounds, win jingles, and/or jackpot sounds, among others. In this manner, a system may be either self-learning and/or manually fed with training data.

In some embodiments, a reverse approach for non-repeated casino environment sounds/voice may be used in noise sources that are more difficult to identify and cancel out. Overcoming these issues may include using a global ANC that is activated in which everything is cancelled out and only the desired sounds are whitelisted and disabled from the ANC. Thus, instead of blacklisting some noise sources, we whitelist some noise sources in such embodiments.

Embodiments herein may include sounds that correspond to one or more announcements and/or related sounds. Such announcement sounds may include general announcements, such as opening/closing times and/or upcoming events, happy hour times and locations, results of bingo type drawings, personal announcements, emergency announcements and/or tournament related announcements, among others. Similar to game sounds, announcement sounds may be discernable to enable splitting such sounds off into different audio channels each and/or may be made editable to the visitor. For example, a visitor may choose to block an bingo related announcements in an area and will route through any happy-hour based announcements to me.

In some embodiments, a casino-specific sound routing component is able to address numerous specific sound types and/or audio channels of one or more origins in the casino simultaneously. For example, routed sounds may include a game's background music, a games bonus music, a jackpot jingle, general casino announcements, and/or casino announcements respective to a bingo drawing, among others.

Some embodiments include an ANC-system that is specific to a casino environment. An ANC system may store casino-specific noises and may differentiate between each of the different sound sources including game sounds, people talking, and/or jackpot sounds, among others.

Figure 4:
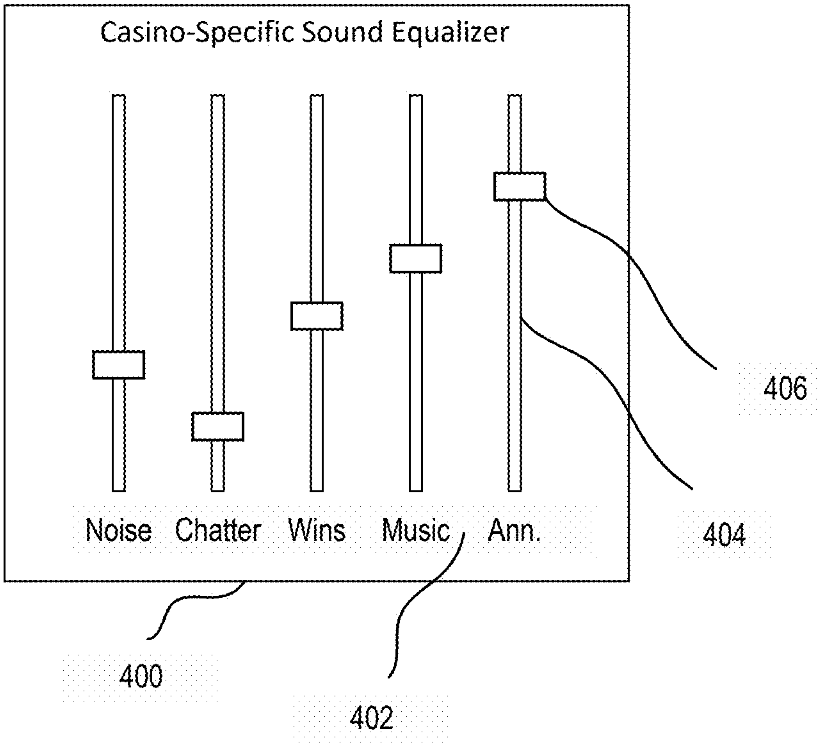
FIG. 4 is a schematic block diagram illustrating a casino specific sound equalizer for routing casino-specific sounds according to some embodiments.

Brief reference is now made to FIG. 4, which is a schematic block diagram illustrating a casino-specific sound equalizer 400. In some embodiments, the casino-specific sound equalizer 400 may include adjustment inputs 406 for multiple sound channels 402. Examples of such sound channels include noise, chatter, winds, music and/or announcements, among others. In such embodiments, a user may move an adjustment input 406 along a gain channel 404 to change the gain corresponding to the respective sound channel 402. In this manner, a user may personalize the sound content corresponding to the different sound channels 402. Thus, some embodiments provide that a user may adjust volume for each sound source of casino-specific sound routing. In some embodiments, an individual may adjust the ANC intensity for each sound source using casino-specific ANC.

Figure 5:
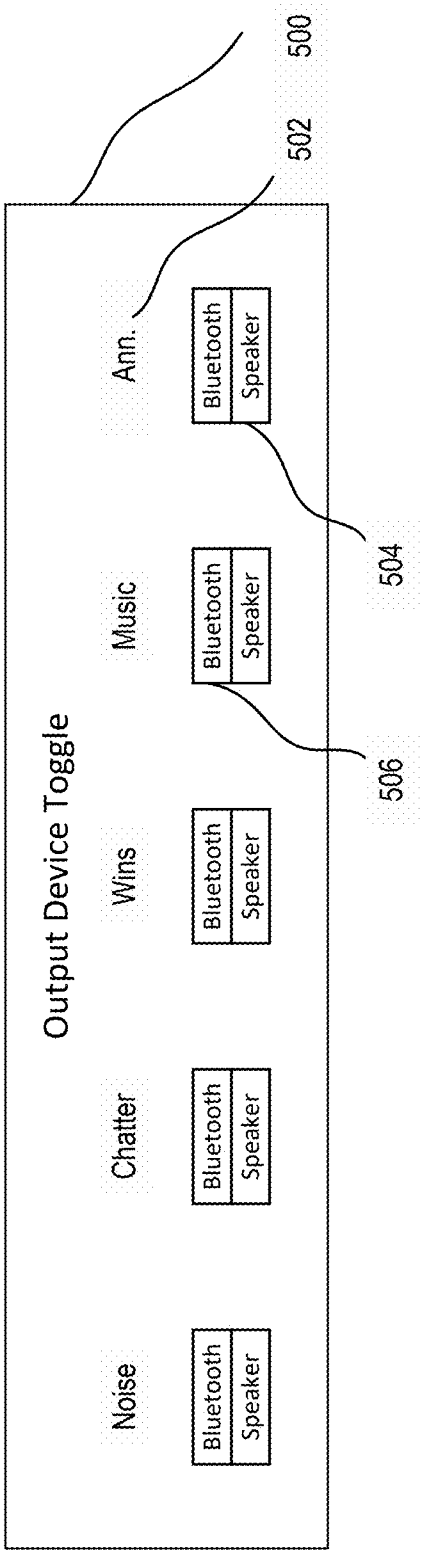
FIG. 5 is a schematic block diagram illustrating output device toggle switch selection according to some embodiments herein.

Brief reference is now made to FIG. 5, which is a schematic block diagram illustrating an output device toggle sound selector. The output device toggle sound selector 500 provides that a user may selectively toggle different output devices for routing sound content. In some embodiments, different sound source channels 502 may be toggled between being output at a speaker based on a speaker input 504 and/or being output at a Bluetooth headphone based on a Bluetooth input 506. For example, a user may select the Bluetooth input 506 for the music sound content channel and a speaker input 504 for the announcement sound content channel.

In some embodiments, the speaker may be a speaker provided by a dedicated speaker for casino premises and/or via a speaker that may be in an EGM. The speaker input 504 may be a physical toggle switch and/or a touch sensor on a display that may be in an EGM and/or may be provided on a user mobile terminal.

In some embodiments, the Bluetooth input 506 may be a physical toggle switch and/or a touch sensor on a display that may be in an EGM and/or may be provided on a user mobile terminal, among others. Thus, some embodiments provide that a user may select the output device as either the Bluetooth output or the speaker output for each sound source of casino-specific sound routing.

In some embodiments, the Bluetooth input 506 and the speaker input 504 may toggle such that only one may be selected. For example, selecting the speaker input 504 for a given sound channel may cause the Bluetooth input 506 to be unselected.

In some embodiments, settings corresponding to audio source specific user preferences may be stored and/or saved. Some embodiments provide that the audio source specific user preferences may be saved in an audio device and may be restored upon connection thereto. In some embodiments, the audio source specific user preferences may be saved on a connected mobile device and may be restored upon connection.

In some embodiments, in addition to typical hearing preferences an EGM gain control may be saved for preferences corresponding to a hearing aid for future use. Such preferences may be executed automatically when connecting to an EGM. In some embodiments, personal EGM audio preferences may be stored on a personal hearing aid device.

Some embodiments provide that personalized gain control may be transferred from hearing aid's processor to an EGM so that EGM sounds may adapt to EGM speaker sound and/or Bluetooth sound.

In some embodiments, the ANC system may be trained with casino-specific voices and/or sounds to make it aware of what repeated sounds are in the casino, and what random sounds are in the casino. In some embodiments, repeated voice, such as staff voice and/or event performer voice may be differentiated based on voice recognition systems. Some embodiments also provide that systems be trained to learn other repeated sounds, such as repeated game sounds, win jingles, and/or jackpot sounds, among others. In some embodiments, a user may be provided with an option such as do not cancel casino staff voice or jackpot sounds out.

In some embodiments, noise sources may be blacklisted. For example, the global casino noise scenery ANC may be disabled and only blacklist those specific noises that the user does not want to hear and blacklist only specific noises to let through.

Some embodiments provide that some noise sources may be whitelisted. In some embodiments, only the global casino noise scenery and only those specific noises may be approved to let through.

Some embodiments provide that the casino visitor may be provided with a history of recently played sound sources, for example in an application and/or on screen, to let the visitor retrospectively adjust how what type of sounds shall be treated in the future.

In some embodiments, an unwanted noise source may come through the ANC system and/or headphones. After realizing that, the user might define this source retrospectively as unwanted, the noise source may be automatically cancelled out the next time.

In some embodiments, this operation may be repeated for retrospective adjustment of the above-mentioned retrospective adjustment multiple times in the case where a new unwanted source is identified. In some embodiments, an intelligent ANC model may be trained in the background, automatically. Thus, the ANC model it will learn from the user's preferences and/or adjust itself and/or self-learning over time to even better meet the user's preferences over time.

In some embodiments, settings corresponding to sound preferences may be saved over time and may be stored over a plurality of different casino visits, casino systems, headphones and/or mobile devices, among others.

Some embodiments provide that the ANC may be controlled via game, for example, the ANC may only turn on while not in idle mode.)

In some embodiments, sound may be routed from an EGM to a headset and cancel all other noise sources. In this manner the EGM may be played using auto-play and continue to play even when the player leaves the machine. In such circumstances, the player may continue to hear the machine even while away from the EGM.

In some embodiments, the sounds played may include just game sounds and my include a game being played by the player and/or sounds from other EGMs. Other non-game sounds may be canceled out.

In some embodiments, jackpot sounds may be exempt from being canceled out.

Some embodiments provide that high wins may by played on the Bluetooth audio device while low win sounds may be played on the EGM. For example, some embodiments provide that high wins and/or triggers may only be played on the headphones and/or may be enhanced by the headphones.

In embodiments in which a player is playing multiple EGMs simultaneously, sounds corresponding to one of the machines may be provided to one of the ears and sounds corresponding to the other EGM may be provided via the other ear of the player. In some embodiments, a player may select to only receive specific sounds while they are connected to an EGM or other system component. Examples of such sounds may include announcements and/or jackpot hits, among others. Some embodiments include providing interactive casino-based content via audio push notifications. Examples of interactive casino based content may include ladies' night wheel starting, free cocktails starting, and/or a specific jackpot being triggered, among others.

In some embodiments, a rich and/or enhanced casino-like sound environment may be created in case there are not many people in the casino. Embodiments may further provide enhanced hearing for a player that may not hear well.

Some embodiments provide a specific channel that may be open for casino messages and/or emergency messages. In some embodiments, the specific channel may inform the player as to which EGMs are hot.

In some embodiments, the voice of waitress coming by and asking for an order may be prioritized relative to other voices.

In some embodiments, play information corresponding to a closest exit may be played on the speaker in the event of an emergency.

Some embodiments include a special Bluetooth audio channel which the user can completely adjust audio from: specific machines, emergency notifications, casino announcements, and/or casino shows, among others.

As disclosed herein, a Bluetooth device, such as a Bluetooth 5.1 standard device, may enable accurate position and location tracking in 3D space using Angle of Arrival (AoA) and Angle of Departure (AoD) tracking without sensors other than the Bluetooth device. Some embodiments herein include implementations using Bluetooth 5.1 with one or more head-worn audio devices in the casino environment for designing novel audio-based gaming features enabled by the 3D tracking capabilities of the Bluetooth 5.1 standard. Some embodiments may create new audio experiences for casino players that are enabled by the capabilities of the head-worn audio devices and that may not be easily provided by conventional capabilities.

Although some embodiments are disclosed herein with reference to a Bluetooth standard and/or device, such embodiments are non-limiting. For example, embodiments herein may include non-Bluetooth devices that communicate using a short-range radio frequency and that use angle of arrival and/or an angle of departure data to provide location and/or position data of the non-Bluetooth device.

Some embodiments herein may enhance audio experiences even further by not requiring complex sensory systems since the position and location tracking may be performed done through the BT 5.1 capabilities. Embodiments further provide that the player may experience audio through head-worn audio devices that may provide active noise cancellation and provide improved audio isolation. Some embodiments may further provide that personal and/or personalized sound experiences may be provided.

In some embodiments, in the context of gaming machines in the venue communicating with each other, each connected gaming device may have data about the 3D positioning of the player relative to the actual gaming machine vs. the one or multiple other gaming machines. In such embodiments, audio experiences may be adjusted accordingly. For example, machine volumes may be determined as a volume of a first machine vs. a volume of a second machine, based on the players' distance to each other.

Some embodiments provide a head-worn audio device that may support Bluetooth 5.1 or newer. Embodiments of devices may include headphones, ear pods, and/or hearing aids, among others. In some embodiments, one or more EGMs may be connected to other EGMs, a player's mobile device and/or a Bluetooth casino system.

Some embodiments include EGMs that may be connected to one or more head-worn audio devices, to one or more other EGMs, a player's mobile device and/or a casino system, including a Bluetooth 5.1 system, among others.

In some embodiments, a player's mobile device may be connected to one or more EGMs, a player's head-worn audio device and/or a casino system, including a Bluetooth 5.1 system, among others.

Some embodiments include a connected casino system, that may include a Bluetooth 5.1 system. Such systems may include data corresponding to head-worn audio device connections that are present and connected. The data may include data corresponding to each connected device separately, data corresponding to clusters of devices, and/or aggregate data corresponding to the connected devices.

Some embodiments provide that the casino system data may be redundant relative to the directly connected ones of the head-worn audio devices if devices & gaming machines are interconnected directly. In some embodiments, the system may use wireless connections other than Bluetooth, such as WiFi, by using the mobile device as an intervening device. Some embodiments may include active noise cancellation (ANC) that may activated and/or de-activated depending on head movement in real-time.

In some embodiments, a connection arrangement may provide that a first player is connected to more than one more EGMs and is playing the multiple EGMs simultaneously. In some embodiments the first player may experience 3D audio features from each of the multiple EGMs. In such embodiments, the EGMs may be directly connected to each other and share information directly with each other, including which audio content they are transmitting, what the distance is to the player and/or which volume they are transmitting, among others. In this manner a multi-game audio experience may be provided for the player. Such embodiments may provide that each EGM may report its information to a casino system, such as a Bluetooth casino system. In such embodiments, the casino system may process the different inputs and provide a resulting output back to each of the EGMs, which may then forward it to the head-worn audio device. In such other embodiments, instead of the casino system communicating with the EGMs may include the casino system talking back to the EGMs and sending the audio content directly to the audio device. In yet further embodiments, a player's mobile device may be connected to the various components (EGMs, audio device) and use mobile device as an intermediate ("man in the middle") type of connection with the casino system.

In this manner, a casino system may not be Bluetooth based and the mobile device may act as central component via Bluetooth to EGM(s) and/or audio device(s). In such embodiments, direct communication to the casino system may be eliminated via other wireless technologies, such as WiFi, among others. Some embodiments may provide that the WiFi may provide faster processing than the Bluetooth.

In some embodiments, a connection arrangement may provide that multiple players are connected one multiplayer EGM and/or a bank of EGMs. Such embodiments may include splitting audio channels between a first player and a second player, identifying the relevant audio for each, track each player's 3D position, simultaneously processing the 3D audio according to the 3D position of each player, and transmit the relevant, 3D-tuned audio respectively, in real-time.

In some embodiments, a connection arrangement may provide that two or more players are connected to a single-player EGM and that both are experiencing 3D audio features. In such embodiments, processes disclosed herein may be included in addition to splitting audio channels between a primary (active) player and a secondary person. A secondary person may include a person that is waiting for the machine to become free, watching the game and/or being interested in the game. In such embodiments, only relevant audio data may be transmitted for each, depending on their role.

In some embodiments, initializing connections may include manual pairing and/or connecting of a player's head-worn audio device with an EGM. In some embodiments, the connecting and/or pairing may be selected from a menu on an EGM. In some embodiments, the head-worn audio device may be connected to a mobile device, then the mobile device may be connected with an EGM and/or casino system either automatically or manually. For example, the mobile device may function as an audio routing device.

Some embodiments include automatically connecting a head-worn audio device and/or mobile device as a routing device with casino system upon a casino visit. Then, the head-worn audio device may have a connection to the EGM automatically, for example, once the player starts to play the EGM. Some embodiments provide that a connection may be initiated responsive to a player cashing based on a player tracking card being inserted and/or using a mobile cashless connect feature. In such embodiments, a connection may be auto-initiated using a player's head-worn audio device. The auto-initiated connection to player's head-worn audio device may know the device of the player and, through player ID, know which device to connect to. In some embodiments, a QR code or other optically displayed code and/or data, among others, may be displayed on a screen of the EGM. Such code may be scanned with mobile device to provide a connection of the head-worn audio device, routed through the mobile device, with the specific EGM and/or casino system. In some embodiments, an NFC tag may be used to connect NFC-compatible audio devices instantly.

In some embodiments, terminating a connection may be caused in response to a player cashing out a play session. For example, cashing out may terminate any Bluetooth connectivity with any machine. Some embodiments provide that cashing out may terminate any payout relevant communication. For example, a player may want to remain connected with machine regarding changes in a progressive jackpot or the like. Some embodiments provide that sensitive in-game or cash-related information from another players' gameplay may not be shared. Some embodiments provide that termination may be based on idle time.

In some embodiments, termination may be performed manually by the player, such as via the EGM and/or via the mobile device screens/settings. Manual termination may also be performed by turning off one or more of the connected devices and/or as a result of an abrupt connection status change, such as through a power interruption, among others.

In some embodiments automatic termination may be performed, such as after a specific game feature has ended. For example, in response to a secondary player joining the main player's game play just for the duration of a bonus feature, the secondary player's connection may be automatically terminated when a bonus feature that the secondary player was watching is finished. Examples may include back-betting opportunities that may terminate immediately after the underlying wager/feature is complete.

Before discussing these and other embodiments in greater detail, reference will be made to an example of a gaming system for implementing embodiments disclosed herein. In this regard, FIG. 1 illustrates a gaming system 10 including a plurality of gaming devices 100 is illustrated. As discussed above, the gaming devices 100 may be one type of a variety of different types of gaming devices, such as electronic gaming machines (EGMs), mobile gaming devices, or other devices, for example. The gaming system 10 may be located, for example, on the premises of a gaming establishment, such as a casino. The gaming devices 100, which are typically situated on a casino floor, may be in communication with each other and/or at least one central controller 40 through a data communication network 50 that may include a remote communication link. The data communication network 50 may be a private data communication network that is operated, for example, by the gaming facility that operates the gaming devices 100. Communications over the data communication network 50 may be encrypted for security. The central controller 40 may be any suitable server or computing device which includes at least one processing circuit and at least one memory or storage device. Each gaming device 100 may include a processing circuit that transmits and receives events, messages, commands or any other suitable data or signal between the gaming device 100 and the central controller 40. The gaming device processing circuit is operable to execute such communicated events, messages or commands in conjunction with the operation of the gaming device 100. Moreover, the processing circuit of the central controller 40 is configured to transmit and receive events, messages, commands or any other suitable data or signal between the central controller 40 and each of the individual gaming devices 100. In some embodiments, one or more of the functions of the central controller 40 may be performed by one or more gaming device processing circuits. Moreover, in some embodiments, one or more of the functions of one or more gaming device processing circuits as disclosed herein may be performed by the central controller 40.

A wireless access point 60 provides wireless access to the data communication network 50. The wireless access point 60 may be connected to the data communication network 50 as illustrated in FIG. 1, and/or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 through the data communication network 50. Each ticket server 90 may include a processing circuit that transmits and receives events, messages, commands or any other suitable data or signal between the ticket server 90 and the central controller 40. The ticket server 90 processing circuit may be operable to execute such communicated events, messages or commands in conjunction with the operation of the ticket server 90. Moreover, in some embodiments, one or more of the functions of one or more ticket server 90 processing circuits as disclosed herein may be performed by the central controller 40.

The gaming devices 100 communicate with one or more elements of the gaming system 10 to coordinate providing wagering games and other functionality. For example, in some embodiments, the gaming device 100 may communicate directly with the ticket server 90 over a wireless interface 62, which may be a WiFi link, a Bluetooth link, a near field communications (NFC) link, etc. In other embodiments, the gaming device 100 may communicate with the data communication network 50 (and devices connected thereto, including other gaming devices 100) over a wireless interface 64 with the wireless access point 60. The wireless interface 64 may include a WiFi link, a Bluetooth link, an NFC link, etc. In still further embodiments, the gaming devices 100 may communicate simultaneously with both the ticket server 90 over the wireless interface 66 and the wireless access point 60 over the wireless interface 64. Some embodiments provide that gaming devices 100 may communicate with other gaming devices over a wireless interface 64. In these embodiments, wireless interface 62, wireless interface 64 and wireless interface 66 may use different communication protocols and/or different communication resources, such as different frequencies, time slots, spreading codes, etc.

The wireless interfaces 62, 66 allow a plurality of head worn audio devices 300, to coordinate the generation and rendering location based enhanced audio features to the player. In some embodiments, the gaming system 10 includes a casino-specific sound routing controller 114. The casino-specific sound routing controller 114 may be a computing system that communicates through the data communication network 50 with the EGMs 100 and the head worn audio devices 300 to perform a casino-specific sound routing operation. Some embodiments may coordinate the generation and transmission of enhanced audio experiences to one or more players using the head worn audio devices 300. The casino-specific sound routing controller 114 may be implemented within or separately from the central controller 40.

In some embodiments, the casino-specific sound routing controller 114 may coordinate the generation and/or transmission of the enhanced audio features and/or experiences.

Moreover, in some embodiments, casino-specific sound routing controller 114 may coordinate the generation and transmission of audio features to players at different physical locations, as will be described in more detail below.

The casino-specific sound routing controller 114 may enable sound to be routed to one or more specific head worn audio devices 300 quickly and accurately and also may enable the head worn audio device 300 to assist the player in navigating the gaming area while using the head worn audio device 300.

In some embodiments, at least some processing of enhanced audio that is rendered by the head worn audio device 300 may be performed by the casino-specific sound routing controller 114, thereby offloading at least some processing requirements from the head worn audio devices 300.

Some embodiments may include an active noise cancelling (ANC) controller 115 that may provide ANC based on inputs casino-specific inputs. For example, an ANC component may be personalized and, in combination with the casino-specific sound routing, may provide personalized dynamic sound controlled by a casino system.

Figure 2A:
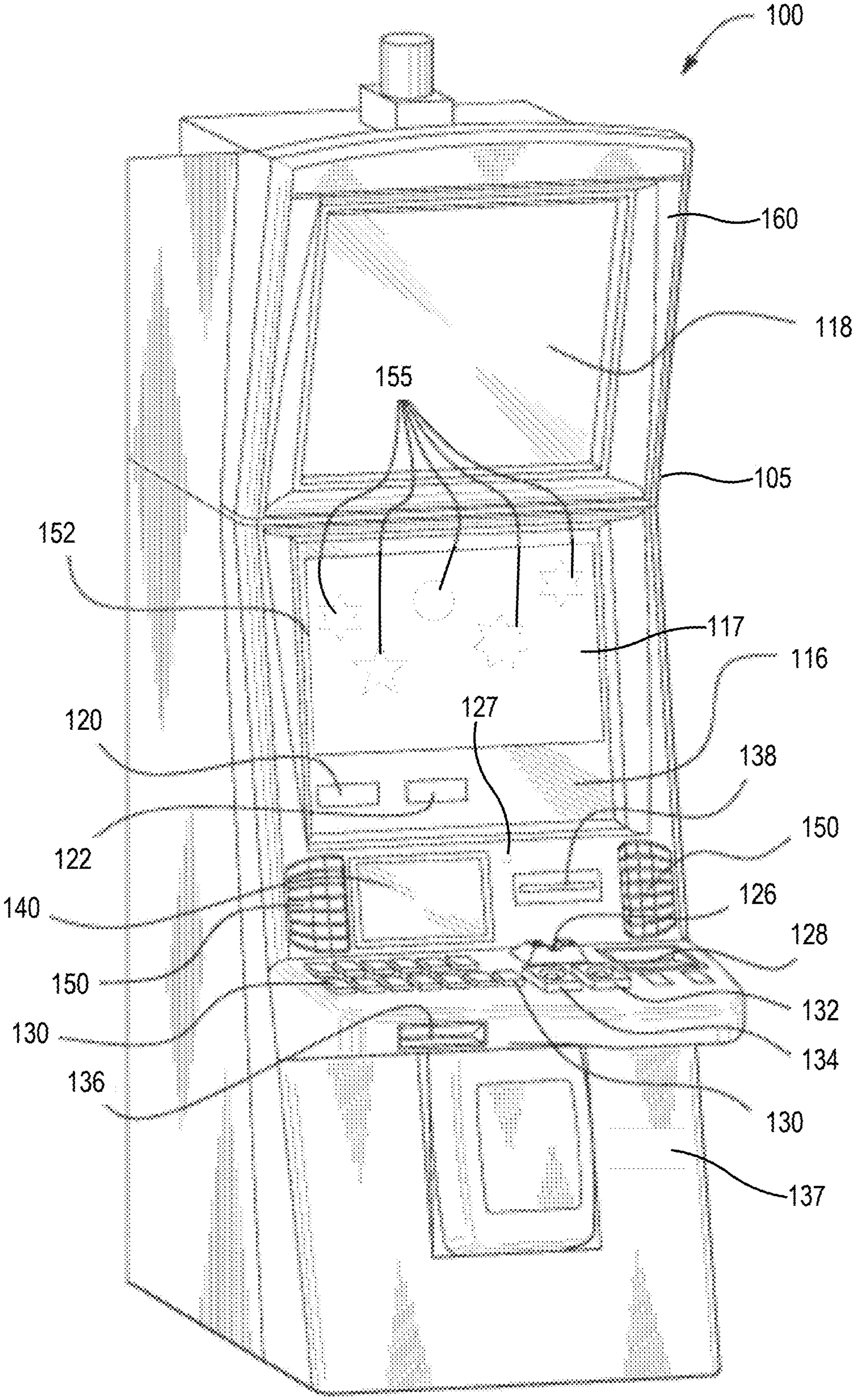
FIG. 2A is a perspective view of a gaming device that can be configured according to some embodiments.
Figure 2B:
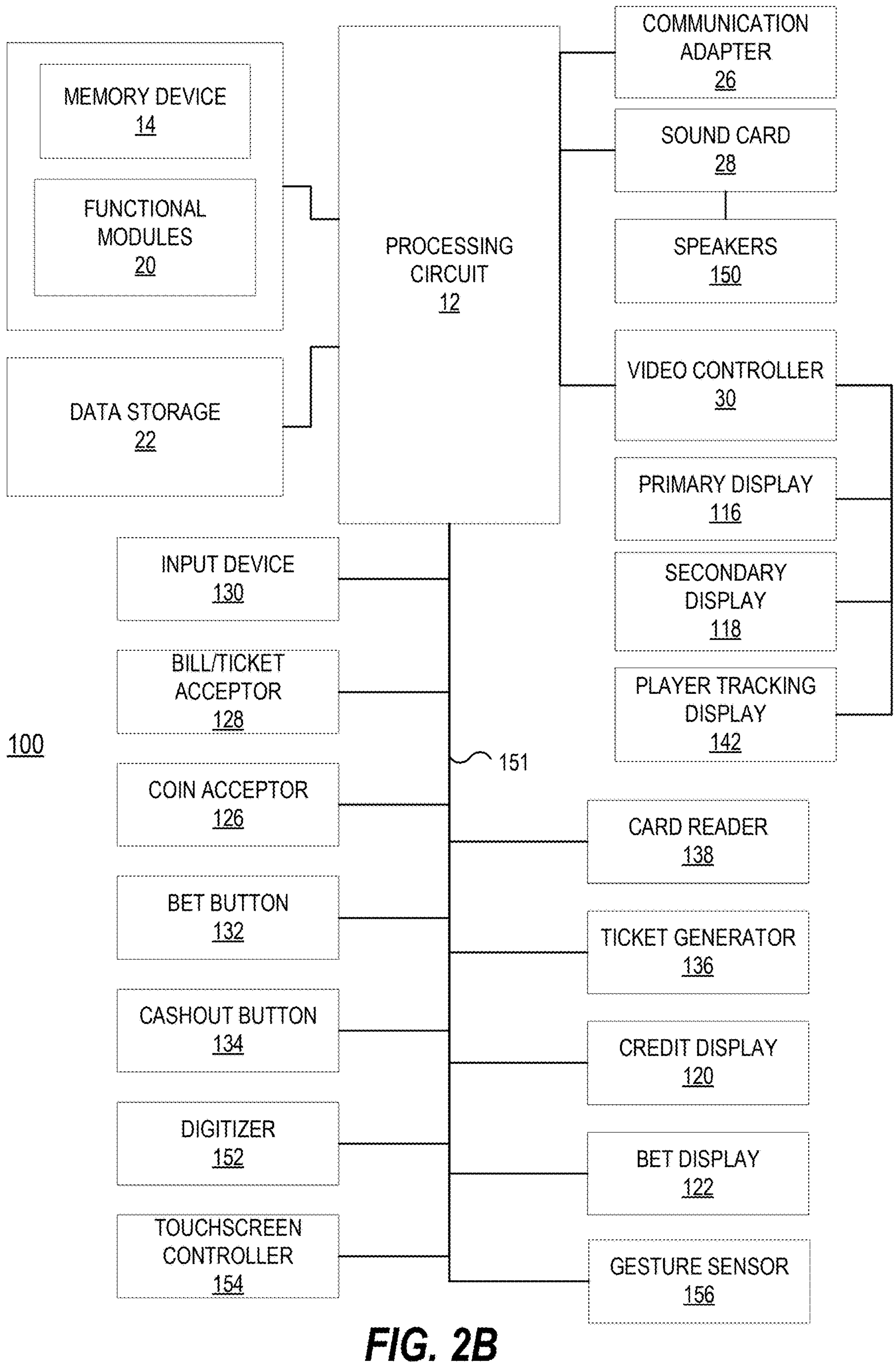
FIG. 2B is a schematic block diagram illustrating an electronic configuration for a gaming device according to some embodiments.
Figure 2C:
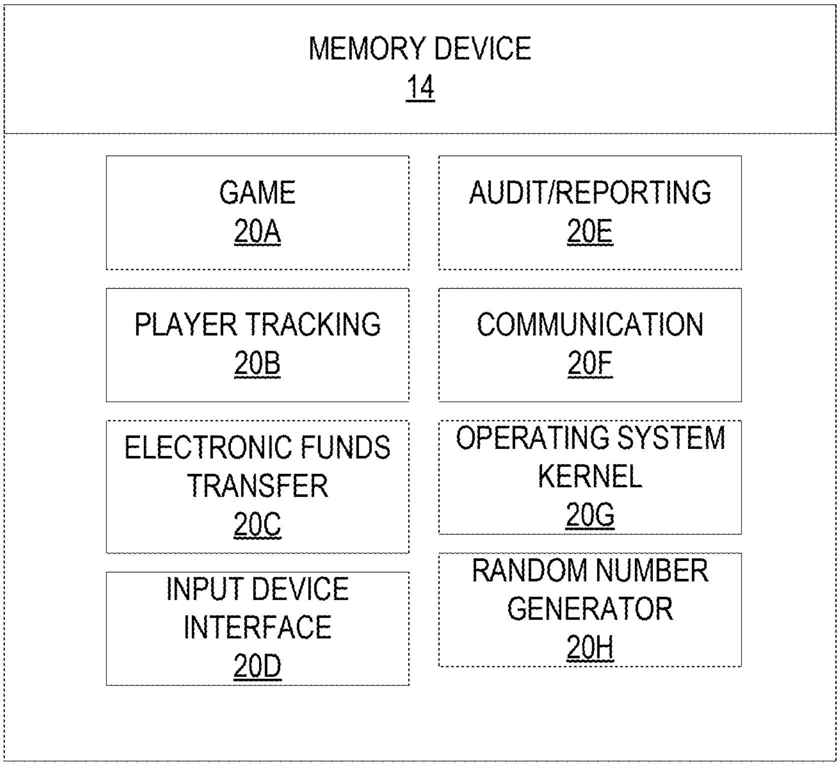
FIG. 2C is a schematic block diagram that illustrates various functional modules of a gaming device according to some embodiments.

Embodiments herein may include different types of gaming devices. One example of a gaming device includes a gaming device 100 that can use gesture and/or touch-based inputs according to various embodiments is illustrated in FIGS. 2A, 2B, and 2C in which FIG. 2A is a perspective view of a gaming device 100 illustrating various physical features of the device, FIG. 2B is a functional block diagram that schematically illustrates an electronic relationship of various elements of the gaming device 100, and FIG. 2C illustrates various functional modules that can be stored in a memory device of the gaming device 100. The embodiments shown in FIGS. 2A to 2C are provided as examples for illustrative purposes only. It will be appreciated that gaming devices may come in many different shapes, sizes, layouts, form factors, and configurations, and with varying numbers and types of input and output devices, and that embodiments are not limited to the particular gaming device structures described herein.

Gaming devices 100 typically include a number of standard features, many of which are illustrated in FIGS. 2A and 2B. For example, referring to FIG. 2A, a gaming device 100 (which is an EGM 160 in this embodiment) may include a support structure, housing 105 (e.g., cabinet) which provides support for a plurality of displays, inputs, outputs, controls and other features that enable a player to interact with the gaming device 100.

The gaming device 100 illustrated in FIG. 2A includes a number of display devices, including a primary display device 116 located in a central portion of the housing 105 and a secondary display device 118 located in an upper portion of the housing 105. A plurality of game components 155 are displayed on a display screen 117 of the primary display device 116. It will be appreciated that one or more of the display devices 116, 118 may be omitted, or that the display devices 116, 118 may be combined into a single display device. The gaming device 100 may further include a player tracking display 142, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the gaming device 100.

The player tracking display 142 may be used to display a service window that allows the player to interact with, for example, their player loyalty account to obtain features, bonuses, comps, etc. In other embodiments, additional display screens may be provided beyond those illustrated in FIG. 2A. In some embodiments, one or more of the player tracking display 142, the credit display 120 and the bet display 122 may be displayed in one or more portions of one or more other displays that display other game related visual content. For example, one or more of the player tracking display 142, the credit display 120 and the bet display 122 may be displayed in a picture in a picture on one or more displays.

The gaming device 100 may further include a number of input devices 130 that allow a player to provide various inputs to the gaming device 100, either before, during or after a game has been played. The gaming device may further include a game play initiation button 132 and a cashout button 134. The cashout button 134 is utilized to receive a cash payment or any other suitable form of payment corresponding to a quantity of remaining credits of a credit display.

In some embodiments, one or more input devices of the gaming device 100 are one or more game play activation devices that are each used to initiate a play of a game on the gaming device 100 or a sequence of events associated with the gaming device 100 following appropriate funding of the gaming device 100. The example gaming device 100 illustrated in FIGS. 2A and 2B includes a game play activation device in the form of a game play initiation button 132. It should be appreciated that, in other embodiments, the gaming device 100 begins game play automatically upon appropriate funding rather than upon utilization of the game play activation device.

In some embodiments, one or more input device 130 of the gaming device 100 may include wagering or betting functionality. For example, a maximum wagering or betting function may be provided that, when utilized, causes a maximum wager to be placed. Another such wagering or betting function is a repeat the bet device that, when utilized, causes the previously placed wager to be placed. A further such wagering or betting function is a bet one function. A bet is placed upon utilization of the bet one function. The bet is increased by one credit each time the bet one device is utilized. Upon the utilization of the bet one function, a quantity of credits shown in a credit display (as described below) decreases by one, and a number of credits shown in a bet display (as described below) increases by one.

In some embodiments, as shown in FIG. 2B, the input device(s) 130 may include and/or interact with additional components, such as gesture sensors 156 for gesture input devices, and/or a touch-sensitive display that includes a digitizer 152 and a touchscreen controller 154 for touch input devices, as disclosed herein. The player may interact with the gaming device 100 by touching virtual buttons on one or more of the display devices 116, 118, 140. Accordingly, any of the above-described input devices, such as the input device 130, the game play initiation button 132 and/or the cashout button 134 may be provided as virtual buttons or regions on one or more of the display devices 116, 118, 140.

Referring briefly to FIG. 2B, operation of the primary display device 116, the secondary display device 118 and the player tracking display 142 may be controlled by a video controller 30 that receives video data from a processing circuit 12 or directly from a memory device 14 and displays the video data on the display screen. The credit display 120 and the bet display 122 are typically implemented as simple liquid crystal display (LCD) or light emitting diode (LED) displays that display a number of credits available for wagering and a number of credits being wagered on a particular game. Accordingly, the credit display 120 and the bet display 122 may be driven directly by the processing circuit 12. In some embodiments however, the credit display 120 and/or the bet display 122 may be driven by the video controller 30.

Referring again to FIG. 2A, the display devices 116, 118, 140 may include, without limitation: a cathode ray tube, a plasma display, an LCD, a display based on LEDs, a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touchscreen with an associated touchscreen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the gaming device 100 are generally configured to display one or more game and/or non-game images, symbols, and indicia. In certain embodiments, the display devices 116, 118, 140 of the gaming device 100 are configured to display any suitable visual representation or exhibition of the movement of objects; dynamic lighting; video images; images of people, characters, places, things, and faces of cards; and the like. In certain embodiments, the display devices 116, 118, 140 of the gaming device 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The gaming device 100 also includes various features that enable a player to deposit credits in the gaming device 100 and withdraw credits from the gaming device 100, such as in the form of a payout of winnings, credits, etc. For example, the gaming device 100 may include a bill/ticket dispenser 136, a bill/ticket acceptor 128, and a coin acceptor 126 that allows the player to deposit coins into the gaming device 100.

As illustrated in FIG. 2A, the gaming device 100 may also include a currency dispenser 137 that may include a note dispenser configured to dispense paper currency and/or a coin generator configured to dispense coins or tokens in a coin payout tray.

The gaming device 100 may further include one or more speakers 150 controlled by one or more sound cards 28 (FIG. 2B). The gaming device 100 illustrated in FIG. 2A includes a pair of speakers 150. In other embodiments, additional speakers, such as surround sound speakers, may be provided within or on the housing 105. Moreover, the gaming device 100 may include built-in seating with integrated headrest speakers.

In various embodiments, the gaming device 100 may generate dynamic sounds coupled with attractive multimedia images displayed on one or more of the display devices 116, 118, 140 to provide an audio-visual representation or to otherwise display full-motion video with sound to attract players to the gaming device 100 and/or to engage the player during gameplay. In certain embodiments, the gaming device 100 may display a sequence of audio and/or visual attraction messages during idle periods to attract potential players to the gaming device 100. The videos may be customized to provide any appropriate information.

The gaming device 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processing circuit determines the amount of funds entered and displays the corresponding amount on the credit or other suitable display as described above.

In some embodiments, the gaming device 100 may include an electronic payout device or module configured to fund an electronically recordable identification card or smart card or a bank or other account via an electronic funds transfer to or from the gaming device 100.

FIG. 2B is a block diagram that illustrates logical and functional relationships between various components of a gaming device 100. It should also be understood that components described in FIG. 2B may also be used in other computing devices, as desired, such as mobile computing devices for example. As shown in FIG. 2B, the gaming device 100 may include a processing circuit 12 that controls operations of the gaming device 100. Although illustrated as a single processing circuit, multiple special purpose and/or general purpose processors and/or processor cores may be provided in the gaming device 100. For example, the gaming device 100 may include one or more of a video processor, a signal processor, a sound processor and/or a communication controller that performs one or more control functions within the gaming device 100. The processing circuit 12 may be variously referred to as a "controller," "microcontroller," "microprocessor" or simply a "computer." The processor may further include one or more application-specific integrated circuits (ASICs).

Various components of the gaming device 100 are illustrated in FIG. 2B as being connected to the processing circuit 12. It will be appreciated that the components may be connected to the processing circuit 12 through a system bus 151, a communication bus and controller, such as a universal serial bus (USB) controller and USB bus, a network interface, or any other suitable type of connection.

The gaming device 100 further includes a memory device 14 that stores one or more functional modules 20. Various functional modules 20 of the gaming device 100 will be described in more detail below in connection with FIG. 2D.

The memory device 14 may store program code and instructions, executable by the processing circuit 12, to control the gaming device 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The gaming device 100 may further include a data storage 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, Digital Video Disc ("DVD") or USB memory device.

The gaming device 100 may include a communication adapter 26 that enables the gaming device 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or NFC that enable the gaming device 100 to communicate, for example, with a mobile communication device operated by a player. The communication adapter 26 may communicate with other devices using a wireless communication protocol that includes location and/or position data to the other devices.

The gaming device 100 may include one or more internal or external communication ports that enable the processing circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, Small Computer System Interface ("SCSI") ports, solenoids, speakers, thumb drives, ticket readers, touch screens, trackballs, touchpads, wheels, and wireless communication devices. In some embodiments, internal or external peripheral devices may communicate with the processing circuit through a USB hub (not shown) connected to the processing circuit 12.

In some embodiments, the gaming device 100 may include a sensor, such as a camera 127, in communication with the processing circuit 12 (and possibly controlled by the processing circuit 12) that is selectively positioned to acquire an image of a player actively using the gaming device 100 and/or the surrounding area of the gaming device 100. In one embodiment, the camera 127 may be configured to selectively acquire still or moving (e.g., video) images and may be configured to acquire the images in either an analog, digital or other suitable format. The display devices 116, 118, 140 may be configured to display the image acquired by the camera 127 as well as display the visible manifestation of the game in split screen or picture-in-picture fashion. For example, the camera 127 may acquire an image of the player and the processing circuit 12 may incorporate that image into the primary and/or secondary game as a game image, symbol or indicia.

Various functional modules of that may be stored in a memory device 14 of a gaming device 100 are illustrated in FIG. 2C. Referring to FIG. 2C, the gaming device 100 may include in the memory device 14 a game module 20A that includes program instructions and/or data for operating a hybrid wagering game as described herein. The gaming device 100 may further include a player tracking module 20B, an electronic funds transfer module 20C, an input device interface 20D, an audit/reporting module 20E, a communication module 20F, an operating system kernel 20G and a random number generator 20H. The player tracking module 20B keeps track of the play of a player. The electronic funds transfer module 20C communicates with a back end server or financial institution to transfer funds to and from an account associated with the player. The input device interface 20D interacts with input devices, such as the input device 130, as described in more detail below. The communication module 20F enables the gaming device 100 to communicate with remote servers and other gaming devices using various secure communication interfaces. The operating system kernel 20G controls the overall operation of the gaming device 100, including the loading and operation of other modules. The random number generator 20H generates random or pseudorandom numbers for use in the operation of the hybrid games described herein.

In some embodiments, a gaming device 100 includes a personal device, such as a desktop computer, a laptop computer, a mobile device, a tablet computer or computing device, a personal digital assistant (PDA), or other portable computing devices. In some embodiments, the gaming device 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 2D:
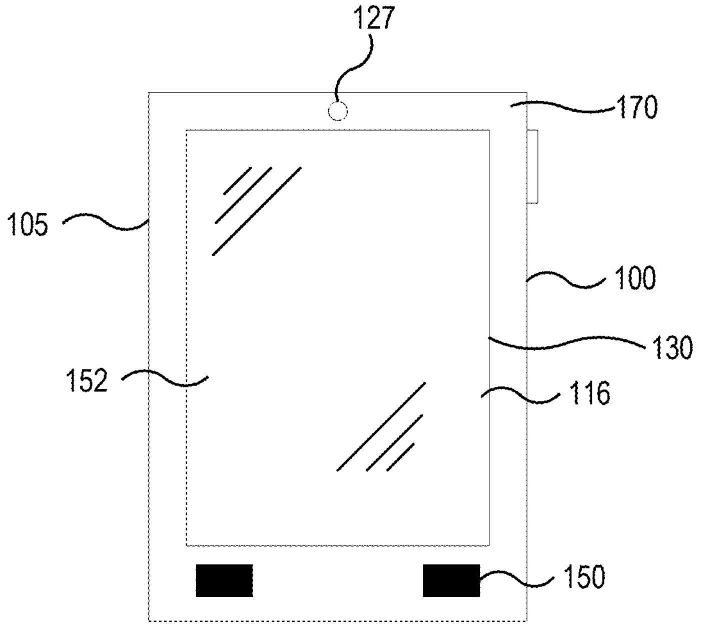
FIG. 2D is perspective view of a gaming device that can be configured according to some embodiments.

For example, referring to FIG. 2D, a gaming device 100 (which is a mobile gaming device 170 in this embodiment) may be implemented as a handheld device including a compact housing 105 on which is mounted a touchscreen display device 116 including a digitizer 152. One or more input devices 130 may be included for providing functionality of for embodiments described herein. A camera 127 may be provided in a front face of the housing 105. The housing 105 may include one or more speakers 150. In the gaming device 100, various input buttons described above, such as the cashout button, gameplay activation button, etc., may be implemented as soft buttons on the touchscreen display device 116 and/or input device 130. In this embodiment, the input device 130 is integrated into the touchscreen display device 116, but it should be understood that the input device may also, or alternatively, be separate from the display device 116. Moreover, the gaming device 100 may omit certain features, such as a bill acceptor, a ticket generator, a coin acceptor or dispenser, a card reader, secondary displays, a bet display, a credit display, etc. Credits can be deposited in or transferred from the gaming device 100 electronically.

Figure 2E:
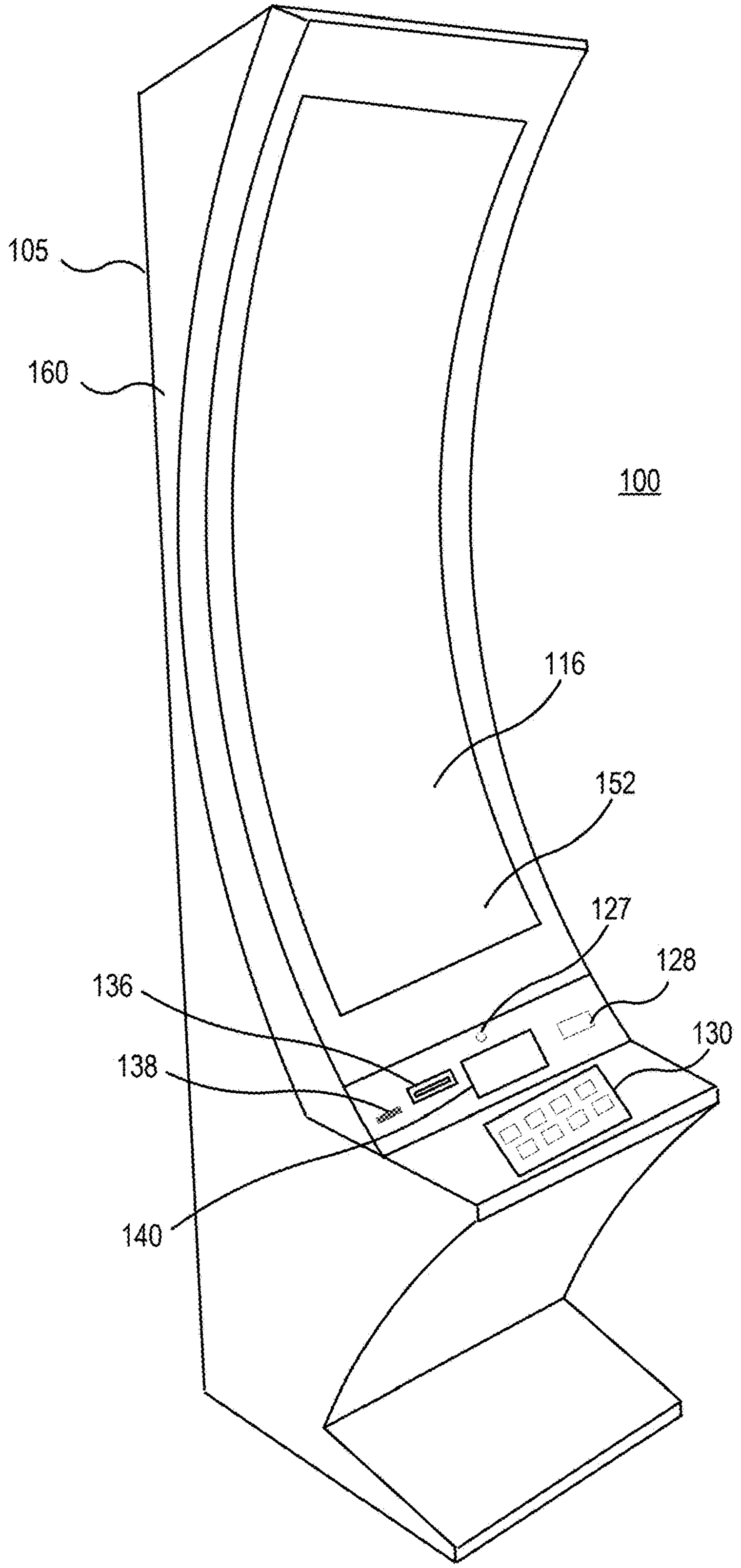
FIG. 2E is a perspective view of a gaming device according to further embodiments.

FIG. 2E illustrates a standalone gaming device 100 (which is an EGM 160 in this embodiment) having a different form factor from the EGM 160 illustrated in FIG. 2A. In particular, the gaming device 100 is characterized by having a large, high aspect ratio, curved primary display device 116 provided in the housing 105, with no secondary display device. The primary display device 116 may include a digitizer 152 to allow touchscreen interaction with the primary display device 116. The gaming device 100 may further include a player tracking display 142, an input device 130, a bill/ticket acceptor 128, a card reader 138, and a bill/ticket dispenser 136. The gaming device 100 may further include one or more cameras 127 to enable facial recognition and/or motion tracking.

Figure 2F:
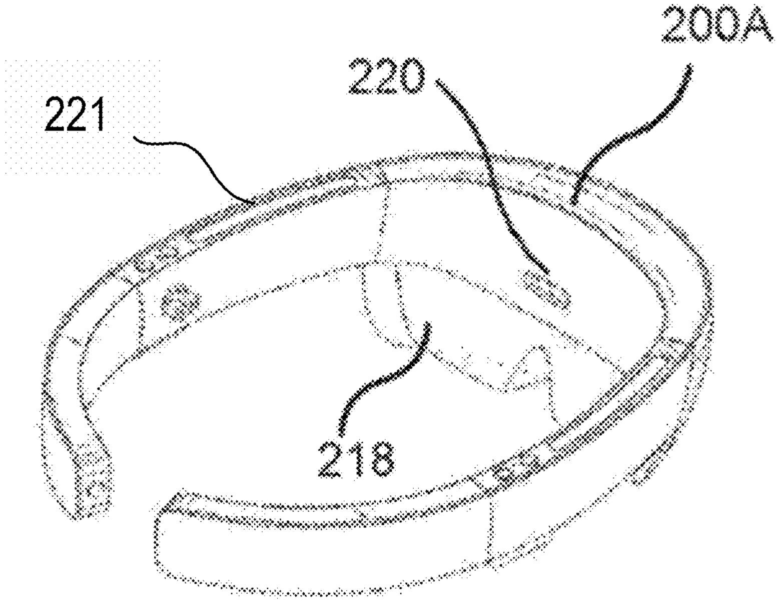
FIGS. 2F and 2G illustrate devices according to various embodiments.

FIG. 2F illustrates an augmented reality viewer 200A implemented as a 3D headset including a pair of displays 218 on which images of virtual objects may be displayed. The augmented reality viewer 200A includes a head-wearable frame 222, with the displays 218 coupled to the frame 221 to position the display device in a field of view of user wearing the augmented reality viewer 200A. Different stereoscopic images may be displayed on the displays 218 to create an appearance of depth. The augmented reality viewer 200A may include a plurality of sensors 220 that the device uses to determine a position, orientation, and/or movement of the augmented reality viewer 200A, which may be used to determine a position, orientation, and/or direction of movement within an SVE.

The augmented reality viewer 200A may further include other sensors, such as a gyroscopic sensor, a GPS sensor, one or more accelerometers, and/or other sensors that allow the augmented reality viewer 200A to determine its position and orientation in space. In some embodiments, the augmented reality viewer 200A may include one or more cameras that allow the viewer 200A to determine its position and/or orientation in space using visual simultaneous localization and mapping (VSLAM). The augmented reality viewer 200A may further include one or more microphones and/or speakers that allow the user to interact audially with the device.

In some embodiments, a viewer may also include semi-transparent lenses that allow the user to see both the real world as well as the 3D image rendered on the lenses, e.g., to provide an augmented reality (AR) experience. The viewer may also include additional cameras or other sensors to obtain a live video signal for building a 3D model of the space around the user. The viewer may also generate a 3D image of an object to display to the user that takes into account the real world objects around the user and allows the user to interact with the 3D object.

Figure 2G:
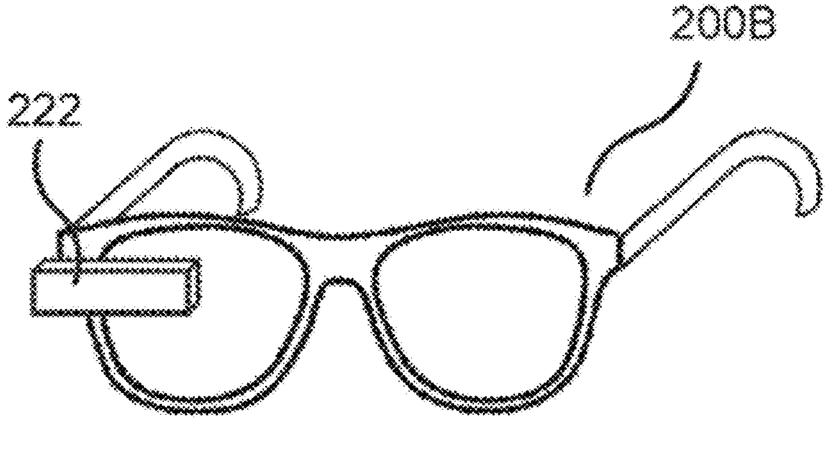

Referring to FIG. 2G, an augmented reality viewer 200B may be implemented as a pair of glasses including a transparent prismatic display 222 that displays an image to a single eye of the user. Such a device may be capable of displaying images to the user while allowing the user to see the world around the user, and as such can be used as an AR device.

In other embodiments, a VR and/or AR viewer may be implemented using a virtual retinal display device that raster scans an image directly onto the retina of the user. In still further embodiments, a VR and/or AR viewer may be implemented using a mobile wireless device, such as the mobile gaming device 170 of FIG. 2D above, a mobile telephone, a tablet computing device, and/or a personal digital assistant, etc.

Although illustrated as certain gaming devices, such as electronic gaming machines (EGMs), mobile gaming devices, VR/AR headsets, head worn audio devices, etc., functions and/or operations as described herein may also include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, gaming devices according to embodiments herein may be implemented using other computing devices and mobile devices, such as smart phones, tablets, and/or personal computers, among others.

Reference is now made to FIGS. 3A-3C, which are schematic block diagrams illustrating view of player audio devices 300 that may be head worn and may have front, top and side views according to some embodiments. Referring to FIGS. 3A-3C, left and right speakers 302 may be mechanically coupled to one another via a head-band 304. In some embodiments, the left and right speakers 302L, 302R may be communicatively coupled to one another. For example, the right and left speakers 302L, 302R may be wirelessly coupled with one another. In some embodiments, the left and right speakers 302L, 302R may be conductively coupled to one another via a wire and/or an electronic circuit.

One or each of the speakers 302 may include communication interfaces 306 that provide communication between the speakers 302 and/or external objects and/or systems.

Figure 6:
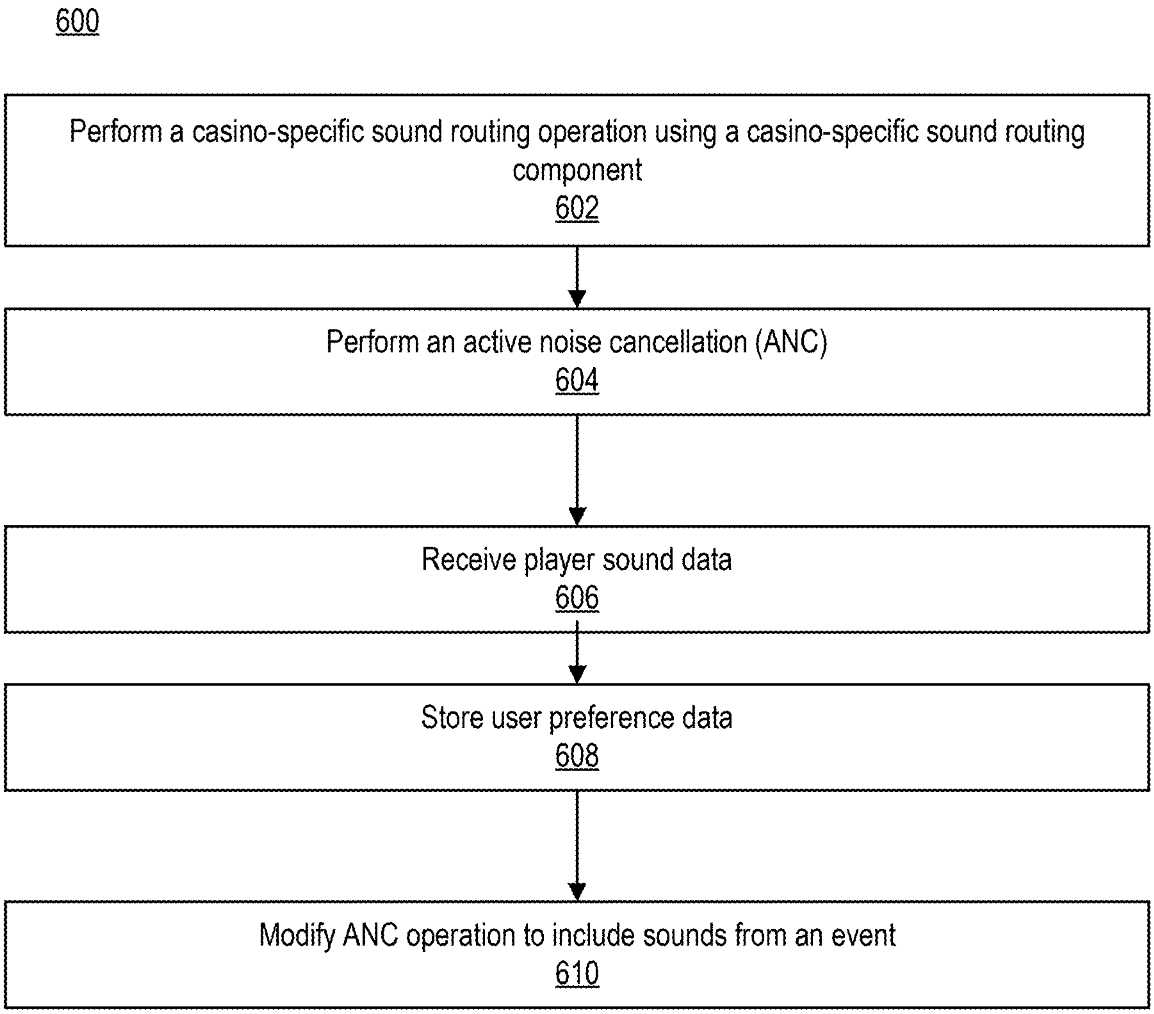
FIG. 6 is a schematic block diagram illustrating operations for providing the player with a dynamic, personalizable audio environment according to some embodiments herein.

Reference is now made to FIG. 6, which is a schematic block diagram illustrating operations for methods for facilitating embodiments described herein. The operations 600 may be performed by one or more processor circuits of one or more computing devices, such as any of the computing devices described herein, for example. For example, a system 600 may include a wireless communication interface that is wirelessly coupled to a plurality of player audio devices in a casino, a processor circuit, a processor circuit and a memory comprising machine-readable instructions that, when executed by the processor circuit, cause the processor circuit to perform (block 602) a casino-specific sound routing operation using a casino-specific sound routing component. In some embodiments, performing the casino-specific sound routing may include dynamically routing casino-specific sounds to adjust specific sound origins.

Some embodiments provide that the processor circuit is further caused to perform (block 604) an active noise cancellation (ANC) operation to receive (block 606) player sound data for adjusting specific sound origins, wherein the received player sound data is used to personalize a casino-specific ANC profile, and to generate an ANC noise signal.

In some embodiments, the wireless communication interface is caused to send the casino-specific sound routing component and the ANC noise signal to ones of the player audio devices.

In some embodiments, a portion of the player audio devices communicates with the processor circuit via an intervening access point.

Some embodiments provide that the casino-specific sound routing component includes a sound type that corresponds to a type of sound being routed. In some embodiments, the ANC operation includes transmitting anti-noise signals to ones of the player audio devices.

In some embodiments, the system may include multiple reference signal microphones that are proximate ones of the player audio devices to provide an ambient noise reference signal for performing the ANC operation.

In some embodiments, the multiple player audio devices are operable to wirelessly communicate with a player's mobile telecommunication device.

Some embodiments provide that the casino-specific sounds include game sounds that are associated with games in a casino, casino environment sounds that are non-game sounds that are present in the casino, and casino announcement sounds that include communications that provide information corresponding to the casino. In some embodiments, the game sounds that are associated with games in the casino may include background music, animation sounds, and/or attract mode sounds, among others.

In some embodiments, the game sounds include multiple audio channels of sound types that include a first sound type that is routed through one of the player audio devices and a second sound type that is routed through an electronic gaming machine (EGM).

In some embodiments, the casino environment sounds include casino staff voices, electronic table game (ETG) sounds and/or event sounds, among others. Some embodiments provide that the casino environment sounds include repeated staff voice sounds that are differentiated using voice recognition.

In some embodiments, the casino announcement sounds include general announcements, emergency announcements, and/or game-related announcements, among others. In some embodiments, the casino announcement sounds include multiple game sounds that are delivered via the multiple player audio devices and via EGMs.

Some embodiments provide that the casino-specific sound routing component addresses multiple sound types and multiple audio channels having multiple origins in the casino.

In some embodiments, the ANC operation may be specific to a casino environment and may differentiate between each of multiple different sound sources.

Some embodiments include a casino-specific sound equalizer that receives multiple inputs that include a volume input for each sound source, an intensity for each sound source and a switch to toggle an output device from one of the player audio devices and an EGM.

In some embodiments, the processor circuit is further caused to store (block 608) user preference data corresponding to audio source specific user preferences. In some embodiments, the user preference data is upgradable based on additional inputs received from the player.

Some embodiments provide that the processor circuit is further caused to modify (block 610) the ANC operation to include sounds from an event of an EGMs to be generated by a different EGM to provide awareness of the event to the different EGM.

In some embodiments, responsive to a casino being unpopulated, the processor circuit is caused to generate simulated sound content to provide sensory impression corresponding to populated casino.

Figure 7:
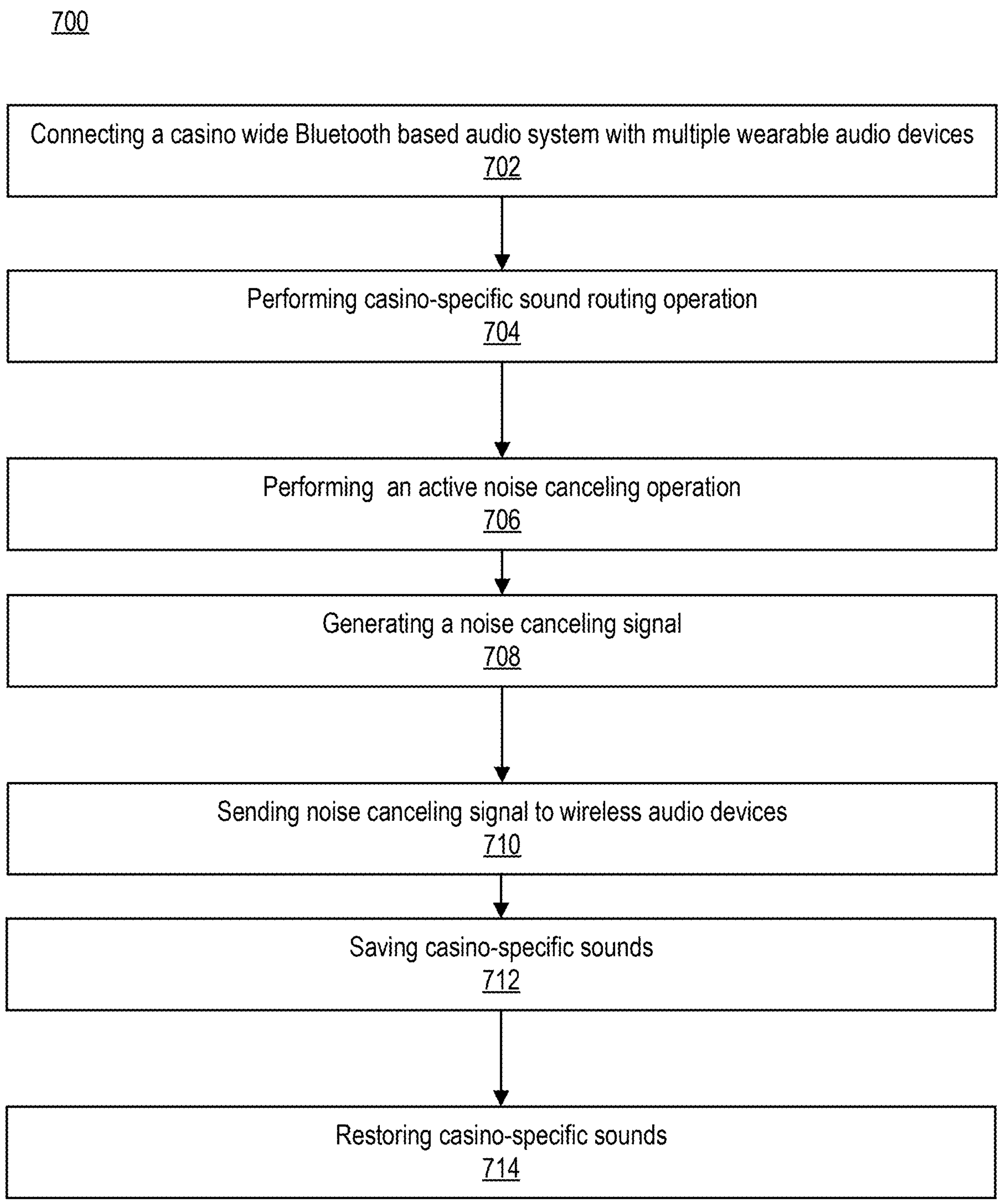
FIG. 7 is a schematic block diagram illustrating operations for providing the player with a dynamic, personalizable audio environment according to some embodiments herein.

Reference is now made to FIG. 7, which is a schematic block diagram illustrating operations for systems, methods, and devices for facilitating embodiments described herein. Operations 700 may be performed by one or more processor circuits of one or more computing devices, such as any of the computing devices described herein. Some embodiments include operations of connecting (block 702) a casino wide Bluetooth based audio system with multiple wearable wireless audio devices. Operations may include performing (block 704) a casino-specific sound routing operation that adjusts casino audio channels. In some embodiments, performing the casino-specific sound routing includes routing casino-specific sounds based on a casino-specific sound routing operation.

Operations may include performing (block 706) an active noise cancelling operation that includes receiving player sound data and generating (block 708) a noise cancelling signal. Operations may include sending (block 710) the noise cancelling signal to a respective one of the wearable wireless audio devices.

Some embodiments include saving (block 712) the casino specific sounds and the noise cancelling signal responsive to one of the wearable wireless audio devices disconnecting from the casino wide Bluetooth based audio system. Operations may include restoring (block 714) the casino specific sounds and the noise cancelling signal responsive to one of the wearable wireless audio devices reconnecting to the casino wide Bluetooth based audio system.

Figure 8:
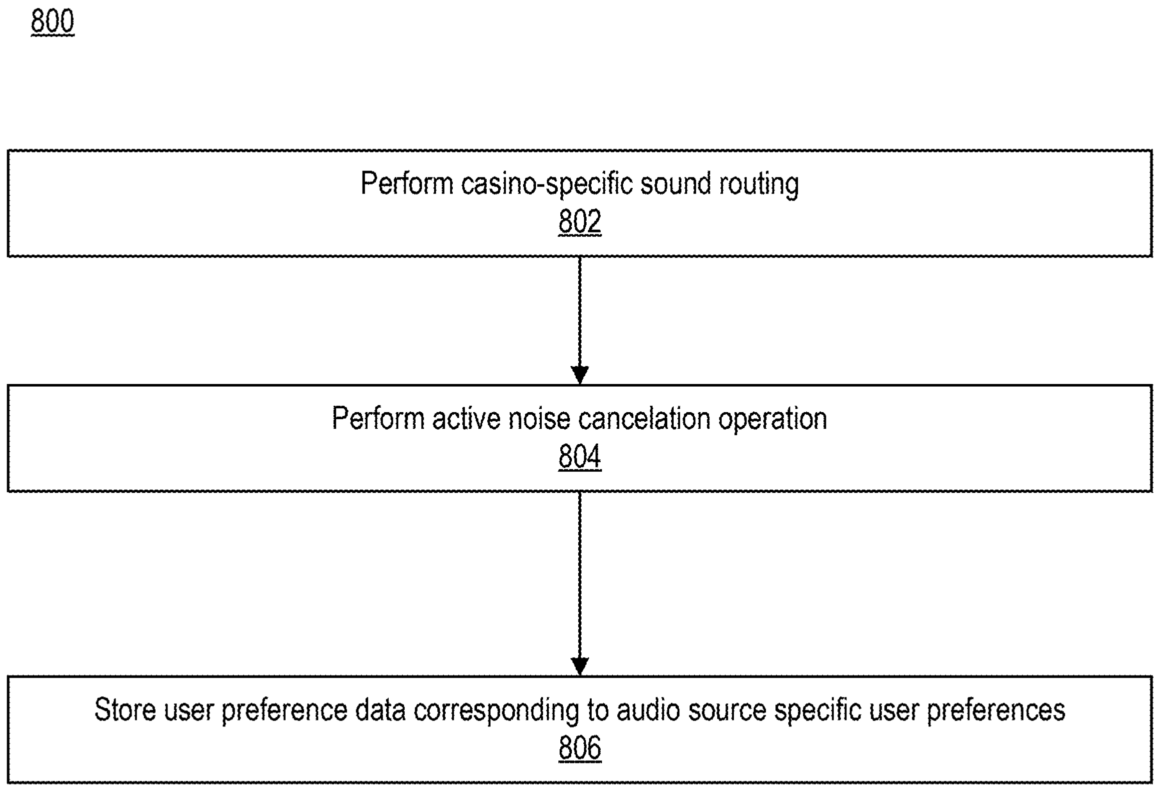
FIG. 8 is a schematic block diagram illustrating operations for providing the player with a dynamic, personalizable audio environment according to some embodiments herein.

Reference is now made to FIG. 8, which is a schematic block diagram illustrating operations for methods for facilitating embodiments described herein. The operations 800 may be performed by one or more processor circuits of one or more computing devices, such as any of the computing devices described herein, for example. A server may include a wireless communication interface that is wirelessly coupled to multiple player audio devices, a processor circuit and a memory comprising machine-readable instructions that, when executed by the processor circuit, cause the processor circuit to perform (block 802) a casino-specific sound routing operation using a casino-specific sound routing component that dynamically routes casino-specific sounds to adjust specific sound origins. In some embodiments, the casino-specific sounds include game sounds that are associated with games in a casino, casino environment sounds that are non-game sounds present in the casino, and casino announcement sounds that comprise communications that provide information corresponding to the casino. The processor circuit may be further caused to perform (block 804) an active noise cancellation (ANC) operation to receive player sound data, to adjust specific sound origins by letting a player personalize a casino-specific ANC profile, and to generate an ANC noise signal.

The processor circuit may be further caused to store (block 806) user preference data corresponding to audio source specific user preferences. In some embodiments, user preference data is upgradable based on additional inputs received from the player. In some embodiments, the wireless communication interface is caused to send the casino-specific sound routing component and the ANC noise signal to ones of the player audio devices.

Embodiments described herein may be implemented in various configurations for gaming devices, including but not limited to: (1) a dedicated gaming device, wherein the computerized instructions for controlling any games (which are provided by the gaming device) are provided with the gaming device prior to delivery to a gaming establishment; and (2) a changeable gaming device, where the computerized instructions for controlling any games (which are provided by the gaming device) are downloadable to the gaming device through a data network when the gaming device is in a gaming establishment. In some embodiments, the computerized instructions for controlling any games are executed by at least one central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In some embodiments, a gaming device may be operated by a mobile device, such as a mobile telephone, tablet other mobile computing device. For example, a mobile device may be communicatively coupled to a gaming device and may include a user interface that receives user inputs that are received to control the gaming device. The user inputs may be received by the gaming device via the mobile device.

In some embodiments, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more gaming devices; and/or (c) one or more personal gaming devices, such as desktop computers, laptop computers, tablet computers or computing devices, PDAs, mobile telephones such as smart phones, and other mobile computing devices.

In certain such embodiments, computerized instructions for controlling any games (such as any primary or base games and/or any secondary or bonus games) displayed by the gaming device are executed by the central server, central controller, or remote host. In such "thin client" embodiments, the central server, central controller, or remote host remotely controls any games (or other suitable interfaces) displayed by the gaming device, and the gaming device is utilized to display such games (or suitable interfaces) and to receive one or more inputs or commands. In other such embodiments, computerized instructions for controlling any games displayed by the gaming device are communicated from the central server, central controller, or remote host to the gaming device and are stored in at least one memory device of the gaming device. In such "thick client" embodiments, the at least one processor of the gaming device executes the computerized instructions to control any games (or other suitable interfaces) displayed by the gaming device.

In some embodiments in which the gaming system includes: (a) a gaming device configured to communicate with a central server, central controller, or remote host through a data network; and/or (b) a plurality of gaming devices configured to communicate with one another through a data network, the data network is an internet or an intranet. In certain such embodiments, an internet browser of the gaming device is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the gaming device, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the gaming device.

It should be appreciated that the central server, central controller, or remote host and the gaming device are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of gaming devices to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product including one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, radio frequency ("RF"), etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, Common Business Oriented Language ("COBOL") 2002, PHP: Hypertext Processor ("PHP"), Advanced Business Application Programming ("ABAP"), dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processing circuit of a general purpose computer, special purpose computer, or other programmable data processing apparatus to produce a machine, such that the instructions, which execute via the processing circuit of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operations to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A system comprising:

a wireless communication interface that is wirelessly coupled to a plurality of player audio devices in a casino;

a processor circuit; and a memory comprising machine-readable instructions that, when executed by the processor circuit, cause the processor circuit to:

perform a casino-specific sound routing operation using a casino-specific sound routing component that dynamically routes casino-specific sounds to adjust specific sound origins, wherein the casino-specific sounds comprise:

game sounds that are associated with games in a casino;

casino environment sounds that are non-game sounds present in the casino;

and casino announcement sounds that comprise communications that provide information corresponding to the casino;

perform an active noise cancellation (ANC) operation to receive player sound data to adjust specific sound origins, wherein the received player sound data is used to personalize a casino-specific ANC profile; and generate an ANC noise signal, wherein the wireless communication interface is caused to send the casino-specific sound routing component and the ANC noise signal to ones of the plurality of player audio devices.

2. The system of claim 1, wherein a portion of the plurality of player audio devices communicates with the processor circuit via an intervening access point.

3. The system of claim 1, wherein the casino-specific sound routing component comprises a sound type based on a type of sound being routed, and wherein the ANC operation comprises transmitting anti-noise signals to ones of the plurality of player audio devices.

4. The system of claim 1, further comprising a plurality of reference signal microphones that are proximate ones of the plurality of player audio devices to provide an ambient noise reference signal for performing the ANC operation.

5. The system of claim 1, wherein the plurality of player audio devices is operable to wirelessly communicate with a player's mobile telecommunication device.

6. The system of claim 1, wherein the game sounds that are associated with games in the casino comprise background music, animation sounds, and attract mode sounds.

7. The system of claim 6, wherein the game sounds comprise a plurality of audio channels of sound types that comprise a first sound type that is routed through one of the plurality of player audio devices and a second sound type that is routed through an electronic gaming machine (EGM).

8. The system of claim 1, wherein the casino environment sounds comprise casino staff voices, electronic table game (ETG) sounds and event sounds.

9. The system of claim 8, wherein the casino environment sounds comprise repeated staff voice sounds that are differentiated using voice recognition.

10. The system of claim 1, wherein the casino announcement sounds comprise general announcements, emergency announcements, and game-related announcements.

11. The system of claim 10, wherein the casino announcement sounds comprise a plurality of game sounds that are delivered via the plurality of player audio devices and via EGMs.

12. The system of claim 1, wherein the casino-specific sound routing component addresses a plurality of sound types and a plurality of audio channels comprising a plurality of origins in the casino.

13. The system of claim 1, wherein the ANC operation is specific to a casino environment and differentiates between each of a plurality of sound sources.

14. The system of claim 1, further comprising a casino-specific sound equalizer that receives a plurality of inputs, wherein the plurality of inputs comprises a volume input for each sound source, an intensity for each sound source and a switch to toggle an output device from one of the plurality of player audio devices and an EGM.

15. The system of claim 1, wherein the processor circuit is further caused to store user preference data corresponding to audio source specific user preferences, and wherein user preference data is upgradable based on additional inputs received from the player.

16. The system of claim 1, wherein the processor circuit is further caused to modify the ANC operation to comprise sounds from an event of an EGMs to be generated by a different EGM to provide awareness of the event to the different EGM.

17. The system of claim 1, wherein, responsive to a casino being unpopulated, the processor circuit is caused to generate simulated sound content to provide sensory impression corresponding to populated casino.

18. A method comprising:

connecting a casino wide short-range radio frequency based audio system with a plurality of wearable wireless audio devices;

performing a casino-specific sound routing operation that adjusts casino audio channels and that routes casino-specific sounds based on a casino-specific sound routing operation, wherein the casino-specific sounds comprise:

game sounds that are associated with games in a casino;

casino environment sounds that are non-game sounds present in the casino; and casino announcement sounds that comprise communications that provide information corresponding to the casino;

performing an active noise cancelling operation that comprises receiving player sound data; generating a noise cancelling signal; and sending the noise cancelling signal to a respective one of the plurality of wearable wireless audio devices, wherein the method further comprises:

saving the casino specific sounds and the noise cancelling signal responsive to one of the plurality of wearable wireless audio devices disconnecting from the casino wide short-range radio frequency based audio system; and restoring the casino specific sounds and the noise cancelling signal responsive to the one of the plurality of wearable wireless audio devices reconnecting to the casino wide short-range radio frequency based audio system.

19. A server comprising:

a wireless communication interface that is wirelessly coupled to a plurality of player audio devices;

a processor circuit; and a memory comprising machine-readable instructions that, when executed by the processor circuit, cause the processor circuit to:

perform a casino-specific sound routing operation using a casino-specific sound routing component that dynamically routes casino-specific sounds to adjust specific sound origins, wherein the casino-specific sounds comprise game sounds that are associated with games in a casino, casino environment sounds that are non-game sounds present in the casino, and casino announcement sounds that comprise communications that provide information corresponding to the casino;

perform an active noise cancellation (ANC) operation to receive player sound data, to adjust specific sound origins by letting a player personalize a casino-specific ANC profile, and to generate an ANC noise signal; and store user preference data corresponding to audio source specific user preferences, and wherein user preference data is upgradable based on additional inputs received from the player, wherein the wireless communication interface is caused to send the casino-specific sound routing component and the ANC noise signal to ones of the plurality of player audio devices.

20. The server of claim 19, wherein a portion of the plurality of player audio devices communicates with the processor circuit via an intervening access point.

* * * * *